US010679314B2

(12) United States Patent
Pronovost et al.

(10) Patent No.: US 10,679,314 B2
(45) Date of Patent: Jun. 9, 2020

(54) TECHNIQUES FOR REDUCING PERCEPTIBLE DELAY IN RENDERING GRAPHICS (71) Applicant: Microsoft Technology Licensing, LLC, Redmond, WA (US)

(72) Inventors: Steve M. Pronovost, Woodinville, WA (US); Benjamin M. Cumings, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/636,074

(22) Filed: Jun. 28, 2017

(65) Prior Publication Data

US 2018/0268512 A1    Sep. 20, 2018

Related U.S. Application Data (60) Provisional application No. 62/471,749, filed on Mar. 15, 2017.

(51) Int. Cl.
G06F 13/14 (2006.01)
G06T 1/20 (2006.01)
G06T 1/60 (2006.01)
G09G 3/20 (2006.01)
G09G 5/36 (2006.01)
G09G 5/12 (2006.01)

(52) U.S. Cl.
CPC .............. G06T 1/20 (2013.01); G06T 1/60 (2013.01); G09G 3/2096 (2013.01); G09G 5/12 (2013.01); G09G 5/363 (2013.01); G09G 2310/08 (2013.01); G09G 2320/0252 (2013.01); G09G 2360/18 (2013.01)

(58) Field of Classification Search
CPC ......... H04N 2013/0096; H04N 21/242; H04N 21/8547; G06F 13/14; G06T 1/20; G06T 1/60

See application file for complete search history.

(56) References Cited

U.S. PATENT DOCUMENTS 7,817,900 B2    10/2010    Walker
8,098,251 B2     1/2012    Chen
(Continued)

OTHER PUBLICATIONS

"Optimizing graphics rendering in Unity games", https://unity3d.com/learn/tutorials/topics/performance-optimization/optimizing-graphics-rendering-unity-games, Retrieved on: Mar. 2, 2017, 12 pages.

Primary Examiner — Weiming He
(74) Attorney, Agent, or Firm — Arent Fox LLP (57) ABSTRACT Examples described herein generally relate to rendering graphics using a graphics processing unit (GPU) in a computing device. A synchronization object associated with a wait event can be created, wherein the wait event indicates a time offset before a timed event associated with a display device of the computing device. A plurality of rendering instructions for the GPU can be stored in a buffer, wherein the plurality of rendering instructions can be received from an application before a release of the synchronization object. Release of the synchronization object can be detected based on occurrence of the wait event, and the plurality of rendering instructions can be sent from the buffer to at least a portion of the GPU based on detecting the release of the synchronization object.

19 Claims, 7 Drawing Sheets (56) References Cited

U.S. PATENT DOCUMENTS

| | | |
|---|---|---|
| 8,390,631 B2 | 3/2013 | McMullen et al. |
| 8,754,904 B2 | 6/2014 | Bakalash et al. |
| 8,854,385 B1 | 10/2014 | Craik et al. |
| 8,860,957 B2 | 10/2014 | Akuzawa |
| 2012/0050550 A1* | 3/2012 | Oba .................. H04N 5/23203 348/207.99 |
| 2012/0249523 A1* | 10/2012 | Choi ..................... G09G 3/003 345/419 |
| 2014/0125680 A1* | 5/2014 | Saulters ................ G06T 1/20 345/502 |
| 2014/0168229 A1 | 6/2014 | Ungureanu et al. |
| 2015/0262322 A1 | 9/2015 | Cardozo |
| 2015/0264298 A1* | 9/2015 | Colenbrander ........ H04N 7/013 345/547 |
| 2016/0110908 A1 | 4/2016 | Ai |
| 2016/0196801 A1* | 7/2016 | Glen ........................ G09G 5/18 345/213 |
| 2016/0360187 A1* | 12/2016 | Smithwick ........... H04N 13/398 |
| 2017/0249920 A1* | 8/2017 | Cook ..................... G09G 5/006 |

* cited by examiner

TECHNIQUES FOR REDUCING PERCEPTIBLE DELAY IN RENDERING GRAPHICS

CLAIM OF PRIORITY UNDER 35 U.S.C. § 119

The present application for patent claims priority to Provisional Application No. 62/471,749, entitled "TECHNIQUES FOR REDUCING PERCEPTIBLE DELAY IN RENDERING GRAPHICS" filed Mar. 15, 2017, which is assigned to the assignee hereof and hereby expressly incorporated by reference herein for all purposes.

BACKGROUND

Use of computing devices is becoming more ubiquitous by the day. Computing devices range from standard desktop computers to wearable computing technology and beyond. One area of computing devices that has grown in recent years are gaming devices and virtual reality (VR) devices, which rely on a graphics processing unit (GPU) to render graphics from a computing device to a display device based on rendering instructions received from the computing device. In gaming devices, a scene produced on a display device can be oriented or modified based on user input (e.g., movement of a gamepad button or stick to cause movement of the orientation of the scene, introduction of items into the scene, etc.). Similarly, in VR devices, the scene produced on a display device can be oriented or modified based on user input, where the input may include detecting movement of the user's head (e.g., detected movement of the head-mounted VR device).

In any case, the user may desire to change the scene at any given time, but in conventional devices that provide rendering instructions to the GPU when the rendering instructions are ready, the GPU may render the image too early in a current frame refresh of the display device before the display device renders the image in the next frame refresh. In this case, any changes to the scene occurring after the rendering may be delayed until the next frame refresh by the display device. In other cases in conventional devices, the GPU may render the image too late in the current frame refresh such that the image misses the next frame refresh, and is displayed in the following frame refresh. In either case, this may result in a perceptible delay experienced by the user of the device.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for rendering graphics using a graphics processing unit (GPU) in a computing device is provided. The method includes creating a synchronization object associated with a wait event, wherein the wait event indicates a time offset before a timed event associated with a display device of the computing device based on which the synchronization object releases, and wherein the timed event is associated with a refresh rate of the display device, storing, in a buffer, a plurality of rendering instructions for the GPU, wherein the plurality of rendering instructions are received from an application before a release of the synchronization object, detecting the release of the synchronization object based on occurrence of the wait event, and sending, based on detecting the release of the synchronization object, the plurality of rendering instructions from the buffer to at least a portion of the GPU.

In another example, a computing device for rendering graphics is provided that includes a memory storing one or more parameters or instructions for executing an operating system and one or more applications, a GPU for rendering frames of the one or more applications for display on a display device coupled to the computing device, a display interface coupled with the display device for communicating signals to display rendered frames on the display device, and at least one processor coupled to the memory, the GPU, and the display interface. The at least one processor is configured to create a synchronization object associated with a wait event, wherein the wait event indicates a time offset before a timed event associated with the display device based on which the synchronization object releases, and wherein the timed event is associated with a refresh rate of the display device, store, in a buffer in the memory, a plurality of rendering instructions for the GPU, wherein the plurality of rendering instructions are received from at least one of the one or more applications before a release of the synchronization object, detect the release of the synchronization object based on occurrence of the wait event, and send, based on detecting the release of the synchronization object, the plurality of rendering instructions from the buffer to at least a portion of the GPU.

In another example, a non-transitory computer-readable medium, comprising code executable by one or more processors for rendering graphics using a GPU in a computing device is provided. The code includes code for creating a synchronization object associated with a wait event, wherein the wait event indicates a time offset before a timed event associated with a display device of the computing device based on which the synchronization object releases, and wherein the timed event is associated with a refresh rate of the display device, code for storing, in a buffer, a plurality of rendering instructions for the GPU, wherein the plurality of rendering instructions are received from an application before a release of the synchronization object, code for detecting the release of the synchronization object based on occurrence of the wait event, and code for sending, based on detecting the release of the synchronization object, the plurality of rendering instructions from the buffer to at least a portion of the GPU.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to scheduling rendering instructions to be executed by a graphics processing unit (GPU) at a time close to, or otherwise based on, a timed event of a display device to reduce perceptible delay in rendering images to the display device. The processing of the rendering instructions may be tied to a notification that can be set to occur at a time interval corresponding to the timed event, a time offset before the timed event, etc. For example, the timed event may be substantially any event related to displaying images, such as a display scan out event (of a display panel) or an event based on the display scan out event, such as a frame refresh time (e.g., a time at which the display device refreshes the display panel, such as a vertical blanking interval (VBI)). For example, this may include a vertical synchronization (VSYNC) time, which may be a time event that is synchronized by the GPU (or central processing unit (CPU) with the frame refresh time of the display device. In any case, associating the processing of rendering instructions with such a notification can cause sending of a rendered frame to the display device when the display device is prepared to refresh the display/render an image, which can reduce perceptible delay, as described further herein.

Also, for example, the rendering instructions may include updated position or orientation data associated with an at least partially rendered image frame of a virtual reality (VR), augmented reality (AR), or mixed reality (MR) image. Thus, the examples described herein can enable an at least partially rendered image frame to be re-projected based on updated position or orientation data in response to occurrence of the notification, which provides the GPU with the time interval for performing the re-projection before a frame refresh time or vertical synchronization time.

In an implementation, a synchronization object can be created based on a wait event, and rendering instructions for the GPU can be buffered until the wait event occurs and the synchronization object is accordingly released. For example, the synchronization object can correspond to an object whose handle (e.g., a pointer in memory or other identifier of the object) can be specified in one of the wait functions to coordinate the execution of multiple threads, such that the handle can be called or released when the wait event occurs. Based on occurrence of the wait event (e.g., and/or corresponding release of the synchronization object), the rendering instructions can be provided to the GPU for rendering an image to be displayed on the display device. The wait event can be associated with the timed event of the display device, such as a frame refresh, such that the GPU can render the image before the timed event on the display device. For example, the wait event can correspond to a time offset from the timed event, where the value of the time offset can be sufficient to allow the GPU to render the image before the timed event, but also significantly close in time to the timed event. Thus, rendering instructions can be buffered up to a time of the wait event to allow for updates to the rendering instructions up until a time that is significantly close to a deadline for providing rendering instructions for rendering an image to the GPU in time for the image to be rendered for display at a next frame refresh. This can reduce the perceptible delay in presenting images to the display device.

In one example, the time offset may be set to a fixed value, which may be fixed in a configuration, determined based on one or more parameters of the GPU or other hardware/capabilities of the computing device, determined based on an application executing to provide rendering instructions to the GPU, determined based on a detected load on the GPU, etc. In another example, the time offset may be modified (e.g., based on feedback) to adapt the time needed for the GPU to render instructions based on determining whether previous renderings by the GPU resulted in images being rendered in time for displaying at a next frame refresh or subsequent frame refresh. In addition, for example, the synchronization event can be created in a processor (e.g., CPU) of the computing device or in the GPU, and the buffer may accordingly be managed to store and release rendering instructions in the CPU or GPU.

Figure 1:
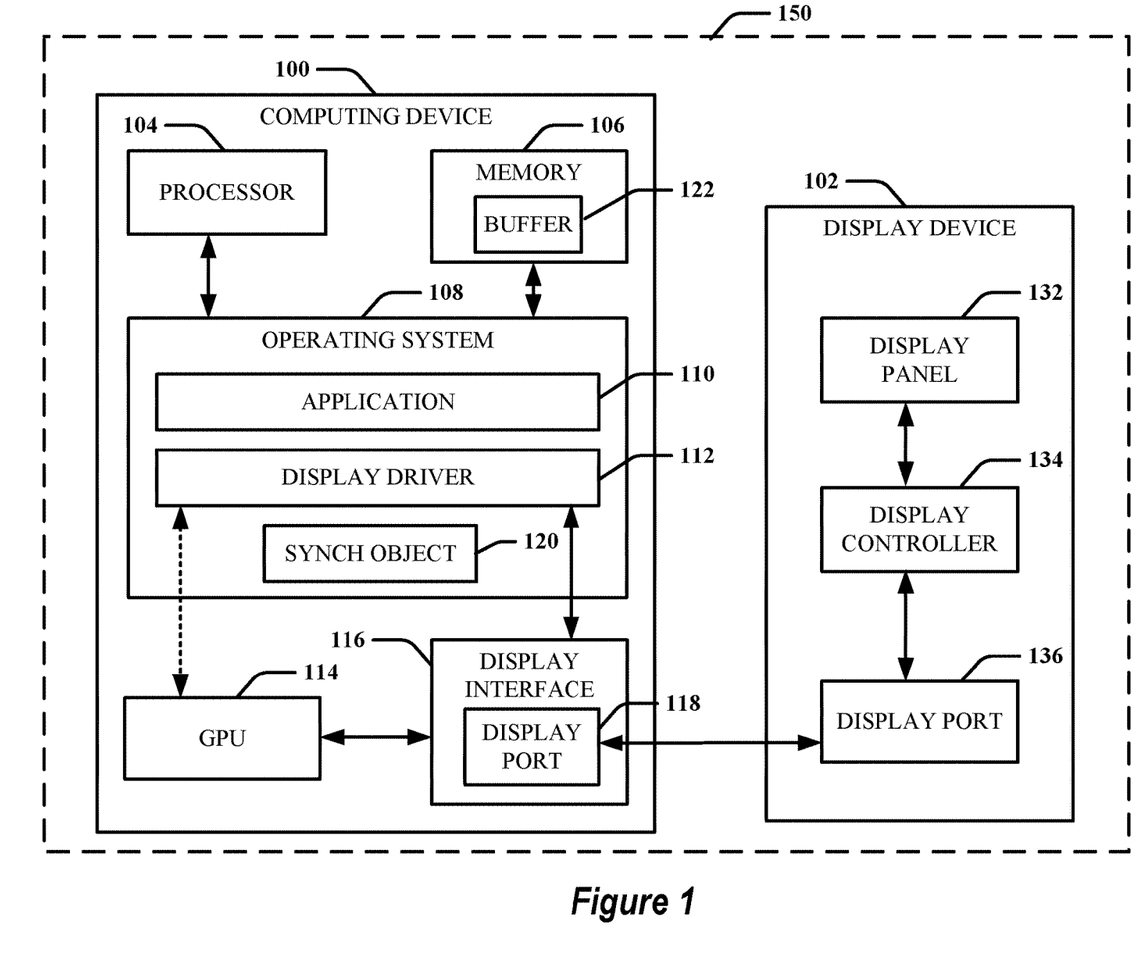
FIG. 1 is a schematic diagram of an example of a computing device and display device communicatively coupled for rendering frames of images based on a synchronization object in accordance with examples described herein.
Figure 2:
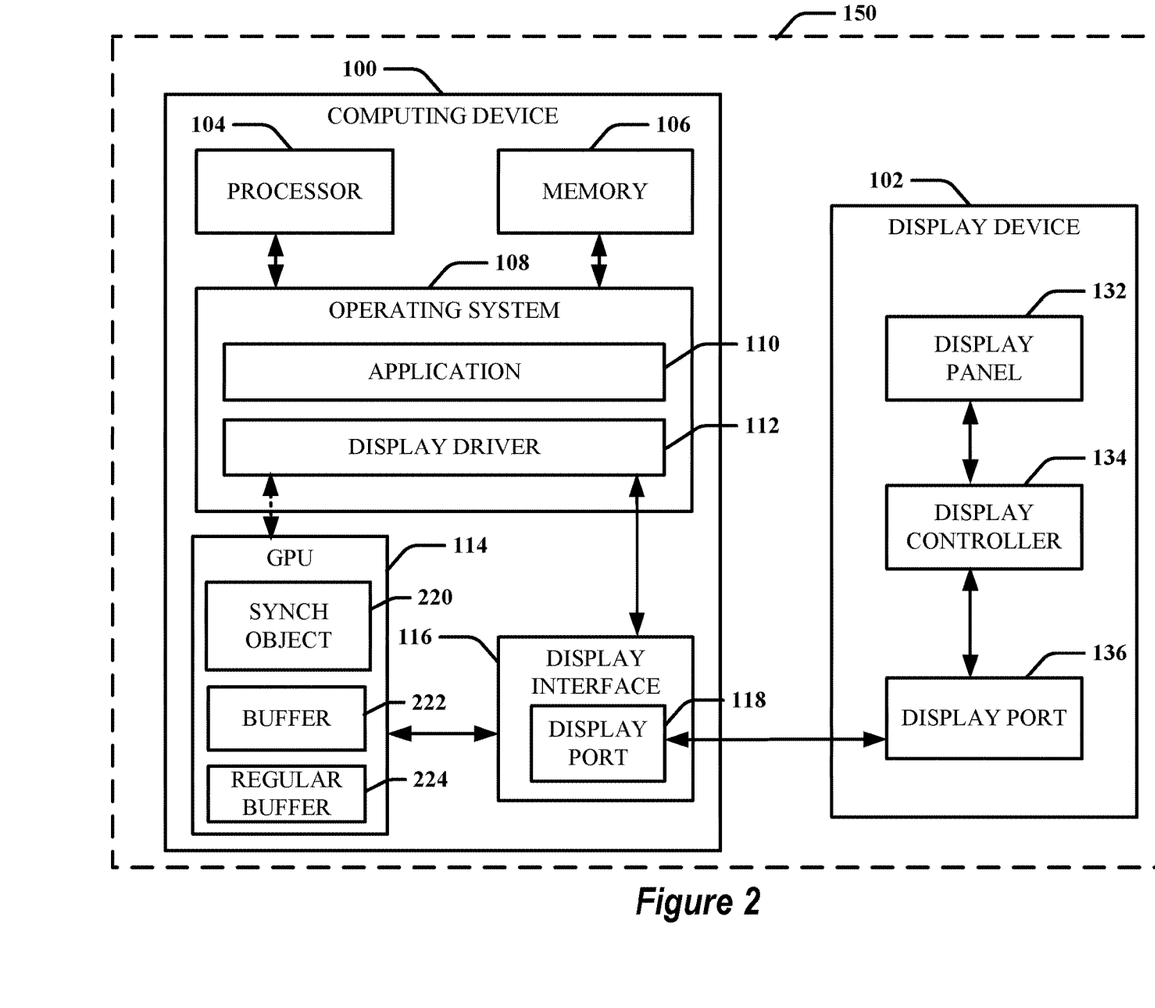
FIG. 2 is a schematic diagram of an example of a computing device and display device communicatively coupled for rendering frames of images based on a synchronization object at a graphics processing unit (GPU) in accordance with examples described herein.
Figure 3:
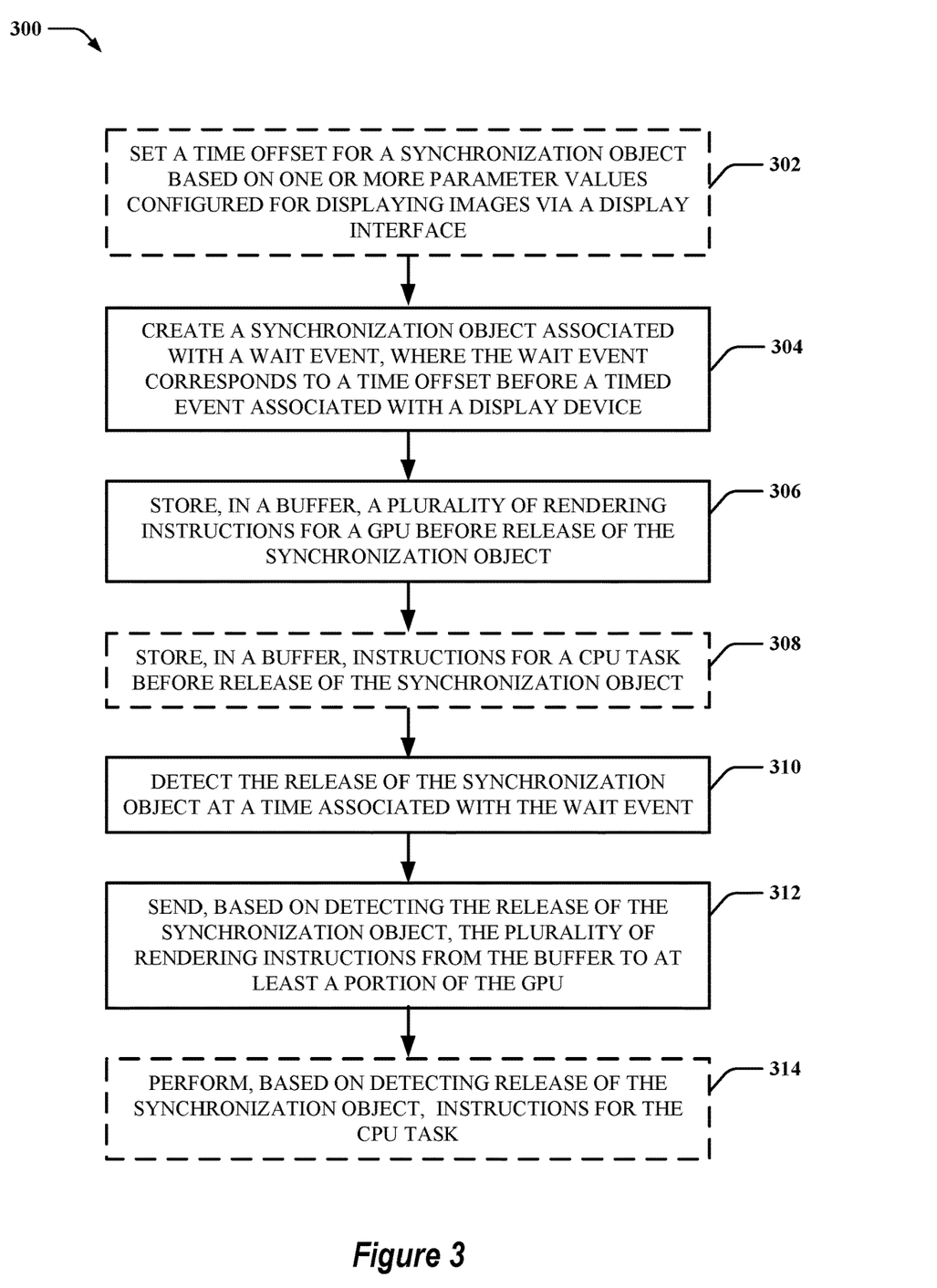
FIG. 3 is a flow diagram of an example of a method for sending rendering instructions based on a synchronization object in accordance with examples described herein.

Turning now to FIGS. 1-7, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIGS. 1 and 2 are schematic diagrams of examples of a computing device 100 and display device 102 that can communicate image data for displaying images on the display device 102. For example, the display device 102 may be an internal display that is within the same housing 150 as computing device 100, a display device that is external to computing device 100, and/or the like. Display device 102 may be capable of displaying a two-dimensional display, such as a desktop, a three-dimensional world, etc. For example, computing device 100 may include or may otherwise be coupled with a processor 104 and/or memory 106, where the processor 104 and/or memory 106 may be configured to execute or store instructions or other parameters related to communicating image data to the display device 102, as described herein. Computing device 100 may execute an operating system 108 (e.g., via processor 104 and/or memory 106) for providing an environment for executing one or more applications 110, such as one or more applications 110 that produce images for display by the display device 102. For example, the computing device 100 may include a VR, AR, or MR device, and additionally, the one or more applications 110 may be one or more VR applications, one or more AR applications, or one or more MR applications operable to cause the generation of VR, AR, or MR images, respectively. The operating system 108 may include a display driver 112 for communicating with a GPU 114 and/or with a display interface 116 of the computing device 100 (e.g., directly or via GPU 114) to cause rendering of one or more images for display on the display device 102.

In an example, display interface 116 can be communicatively coupled with the processor 104 and/or memory 106 for communicating with the display device 102 via a display port 118. Display port 118, as referred to herein, may include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and display device 102.

For example, display device 102 may include a display panel 132 for displaying one or more images based on signals received from a display controller 134. For example, the display panel 132 may include a liquid crystal display (LCD) (which may include a light emitting diode (LED) backlit LCD display), organic LED (OLED) display, digital light processing (DLP) display, etc. Display device 102 may include, but is not limited to, a monitor, a television, a projector, or substantially any type of embedded, external, wireless, etc., display configured for communicating with computing device 100 via an embedded, external, or wireless display port 136. As mentioned, display controller 134 provides signals to the display panel 132 to cause display of images. In an example, display controller 134 may include a printed circuit board (PCB), programmable logic controller (PLC), etc., coupled with the display panel 132 to control the display panel 132 to display images based on commands received via display port 136. Thus, for example, display controller 134 may be or may include a processor configured for sending the signals to the display panel 132 based on image data (e.g., rendered image frames) received via display port 136.

In an example, computing device 100 can generate image data for providing to the display device 102 for displaying on display panel 132. Computing device 100 can accordingly communicate the image data to the display device 102 via display interface 116 using display port 118 to communicate signals corresponding to the image data to display port 136 for providing to display controller 134.

In an example, application 110 can generate images for displaying on display device 102, and display driver 112 may provide rendering instructions for rendering the images to GPU 114 (e.g., via display interface 116 or otherwise). In one example, GPU 114 can be part of the display interface 116 (e.g., a processor on a circuit board of the display interface 116). In another example, GPU 114, display interface 116, etc., may be integrated with processor 104. Substantially any combination of hardware can be possible such that GPU 114, display interface 116, etc., can communicate with processor 104 via a bus to facilitate providing the rendering instructions from the display driver 112 executing on the processor 104 (e.g., via the operating system 108) to the GPU 114. GPU 114 can process the rendering instructions to generate a rendered frame for displaying on display device 102, and can transmit associated signals to the display device 102 via display port 118 of display interface 116. The display device 102 can receive the signals generated by the GPU 114, and display controller 134 can accordingly cause display panel 132 to draw or display the rendered frame based on the signals.

In examples described herein, a synchronization object can be created to control when at least some portion of the rendering instructions are sent to the GPU 114 and/or from one portion of the GPU 114 to another portion of the GPU 114. For example, the synchronization object can be created and associated with a wait event, or another event that causes notification (e.g., based on a registered handle) when the event occurs. For example, the synchronization object handle can be specified as part of the wait event, such that the handle is called or released when the wait event occurs, and occurrence of the wait event (e.g., a call to the handle or release of the handle) can accordingly be detected. After (or based on) occurrence of the wait event, the rendering instructions are sent to the GPU 114 in an attempt to cause rendering as close to another event (e.g., a frame refresh) as possible.

For example, the wait event can correspond to a specified time at which the wait event occurs (and thus the synchronization object is released). The wait event can correspond to a time offset from a timed event related to the display device 102, such as an event when a frame refresh occurs (e.g., at the display panel 132), which may be correlated with a VSYNC at the display interface 116. For example, VSYNC can refer to the display interface 116 synchronizing sending of a rendered frame to the display device 102 when the display device 102 is prepared to render an image, such as at the frame refresh (e.g., or VBI) of the display panel 132. For example, display device 102 may indicate a timing of the frame refresh to the display interface 116 and/or the display interface 116 may configure the display device 102 to operate at the frame refresh (e.g., a refresh rate, such as 60 hertz). In either case, display interface 116 can know when the display device 102 performs frame refresh, and can correspondingly set VSYNC in order to synchronize providing rendered frames to the display device 102 with the frame refresh. In this example, one or more rendering instructions for rendering an image frame can be buffered until the wait event occurs (e.g., and a corresponding synchronization object is released) at some time before the timed event related to the display device 102. At this time, the rendering instructions can be sent to the GPU 114 (or to a different portion of the GPU 114) for processing in an attempt for processing to complete before (e.g., within a threshold period of time before) the timed event related to the display device 102. The GPU 114 can accordingly process the rendering instructions to generate the rendered frame for displaying via display device 102.

In FIG. 1, for example, operating system 108 can create the synchronization object 120 (e.g., via application 110, display driver 112, and/or the like). The synchronization object 120 can be created based on a wait event, where a time (e.g., an actual or system time) or timing (e.g., a time interval, which may be indicated from a starting actual or system time) of the wait event corresponds to the time offset from the timed event related the display device 102 (e.g., based on VSYNC at the display interface 116, frame refresh at the display device 102, etc.). In this example, buffer 122 can store rendering instructions before occurrence of the wait event (e.g., and/or before corresponding release of the synchronization object 120). Synchronization object 120 can be released based on occurrence of the wait event, which can be signaled to the operating system 108 (e.g., and/or application 110, display driver 112, etc.). The operating system 108 (e.g., and/or application 110, display driver 112, etc.) can detect the released synchronization object 120 (e.g., based on a callback to or release of the handle of the synchronization object 120) and can accordingly release the rendering instructions from buffer 122 for providing to the GPU 114 based on release of the synchronization object 120. The operating system 108 (e.g., and/or application 110, display driver 112, etc.) can provide the rendering instructions to the GPU 114 to facilitate generating the rendered frame after the wait event and providing the corresponding signals to the display device 102 before (e.g., significantly close in time to) the next frame refresh (e.g., according to VSYNC). Thus, in an example where the rendering instructions may include updated position or orientation data associated with an at least partially rendered image frame of a virtual reality (VR), augmented reality (AR), or mixed reality (MR) image, the release of the synchronization object 120 can enable the at least partially rendered image frame to be re-projected based on updated position or orientation data close in time to a frame refresh or VSYNC time, which can reduce perceptible latency in the rendered image.

In FIG. 2, for example, GPU 114 can create the synchronization object 220 (e.g., based on a configuration or command from operating system 108, application 110, display driver 112, and/or the like). The synchronization object 220 can be created based on a wait event corresponding to the time offset from the timed event related to the display device 102. In this example, buffer 222 can store rendering instructions received from the display driver 112 before release of the synchronization object 220 based on occurrence of the wait event. GPU 114 can include a regular buffer 224 for storing and obtaining commands related to other tasks so the other tasks are not blocked based on the wait event. Synchronization object 220 can be released based on occurrence of the wait event. For example, a handle of the synchronization object 220 that was registered with the wait event can be modified or called when occurrence of the wait event is detected. GPU 114 can accordingly begin processing the rendering instructions from buffer 222 for generating the rendered frame and providing corresponding signals to the display device 102 for displaying the rendered frame before (e.g., significantly close in time to) the next frame refresh (e.g., according to VSYNC).

FIG. 3 is a flowchart of an example of a method 300 for buffering rendering instructions based on a synchronization object. For example, method 300 may be performed by a computing device and display device communicatively coupled with one another, and is accordingly described with reference to FIGS. 1 and 2, for example.

In method 300, optionally at action 302, a time offset for a synchronization object can be set based on one or more parameter values configured for displaying images via a display interface. In an example, operating system 108, application 110, display driver 112, etc., e.g., in conjunction with processor 104 and/or memory 106, can set the time offset for the synchronization object based on one or more parameter values configured for displaying the images via the display interface 116. For example, the time offset can be an offset from a timed event (e.g., frame refresh, VSYNC, etc.) of the display device 102, as described above, and can be determined and/or set to allow adequate time for a GPU 114 to generate the rendered frame (or an updated version of the rendered frame, e.g., a re-projected frame) for sending to the display device 102 via display interface 116 to display the rendered frame at frame refresh. For example, the one or more parameters can relate to specification-based and/or real-time capabilities of the display device 102, GPU 114, and/or display interface 116, such as specification-based or historical processing speed, experienced or predicted load on the display device 102, GPU 114, and/or display interface 116, etc. In another example, the one or more parameters can be specified by and/or relate to one or more parameters of or detected by the application 110 providing the rendering instructions (e.g., complexity of a scene received from the application 110 such that a larger time offset can be selected for a scene determined to be more complex, number of re-projections of the scene received from the application 110 such that a larger time offset can be selected where a larger number of re-projections are received, etc.). In one example, where the time offset is updated in this regard while waiting on a wait event, the time associated with the wait event may be updated if updating the time is supported by the synchronization object.

In another example, the time offset can be set based on previous renderings by the GPU 114 based on previous time offsets (e.g., based on feedback or determined timings of the previous renderings). For example, operating system 108, application 110, display driver 112, etc., may determine whether renderings using a previous time offset resulted in GPU 114 processing the rendering instructions in time to generate the rendered frame for display in a next frame refresh or whether the rendered frame was generated too late, a percentage of previous renderings where the previous time offset resulted in GPU 114 processing the rendering instructions in time to provide the rendered frame for display in a next frame refresh, etc. In an example, this may be determined at least in part by comparing a system time when the GPU 114 completed sending instructions to the display device 102 to the VSYNC time to determine whether the instructions were completely sent before VSYNC. For example, the time offset may be set or adjusted based on the percentage (e.g., increased if at least a threshold percentage is achieved, decreased if at least another threshold percentage is not achieved, etc.). Moreover, in an example, operating system 108, application 110, display driver 112, etc., may determine a time difference between the time of the GPU 114 completing processing of the rendering instructions and the time of the next frame refresh (e.g., the time of the next VSYNC), and can set the time offset based on the difference (e.g., as a fraction of the difference or offset from the difference) to move the GPU 114 processing closer to the next frame refresh (e.g., the VSYNC).

In method 300, at action 304, a synchronization object associated with a wait event can be created, where the wait event corresponds to a time offset before a timed event associated with a display device. In an example, operating system 108, application 110, display driver 112, etc., e.g., in conjunction with processor 104 and/or memory 106, can create the synchronization object 120 associated with the wait event, where the wait event corresponds to the time offset before the timed event associated with the display device 102. For example, operating system 108, application 110, display driver 112, etc., can create the synchronization object 120 as a wait synchronization object that can block one or more actions until a wait event occurs, at which time the wait synchronization object is triggered or otherwise notified of the wait event occurrence (e.g., based on a handle of the synchronization object 120 that is registered with the wait event based on occurrence of one or more conditions of the wait event). For example, the wait event can be set to a time that corresponds to the time offset from the timed event associated with the display device 102 such that when the time occurs, the wait event occurs, and any corresponding synchronization objects are released. In one example, display interface 116 can determine the timed event of the display device 102, which can correspond to a frame refresh on the display device 102, a corresponding VSYNC specified by the display interface 116 (which can be based on the frame refresh of the display device 102), etc. In one example, display interface 116 can determine or set this value based on receiving the value from the display device 102 and/or controlling the display device 102 to operate based on the value.

In any case, synchronization object 120 can be created based on a wait event that is set to occur at a time offset before the timed event of the display device 102. In an example, the time offset can be a fixed value, such as 2 milliseconds (ms) or another time value. In other examples, as described, the operating system 108, application 110, display driver 112, etc. can set or adjust the time offset based on one or more parameters related to displaying an image on display device 102 and/or via display interface 116, based on analyzing previous rendering by the GPU 114 (e.g., feedback parameters) to determine whether signals were provided to the display device 102 in time to display the image in the next frame refresh, etc.

In method 300, at action 306, a plurality of rendering instructions for a GPU can be stored in a buffer before release of the synchronization object. In an example, operating system 108, application 110, display driver 112, etc., e.g., in conjunction with processor 104 and/or memory 106, can store, in the buffer 122, the plurality of rendering instructions for the GPU 114 before release of the synchronization object. For example, application 110 can generate the rendering instructions, e.g., via processor 104, for producing one or more images of a scene corresponding to the application 110. The rendering instructions can indicate commands and/or corresponding parameters for execution by the GPU 114 relating to details of the one or more images to facilitate rendering thereof. Processing of these instructions by the GPU 114 can typically occur within a discernable period of time, and thus the time offset may be set to correspond to this time and/or a time slightly greater than this time to facilitate rendering completing with enough time to provide display instructions to display device 102 by the time of frame refresh.

In addition, the application 110 may generate rendering instructions for one or more re-projections of the scene or image depicted by the rendered frame based on user input. As described, for example, device 100 may include a head-mounted VR device, the user input may include movement of a user's head, and thus detected movement of a head-mounted VR device that results in user input to reorient the scene. In another example, the user input may include activating one or more buttons of a gamepad that cause reorientation of the scene, introduction of one or more additional features in the scene, etc. The application 110 accordingly generates additional or alternative rendering instructions, in this example, for the GPU 114 to process and render modification of the scene or image depicted by the rendered frame based on user input. The additional or alternative rendering instructions can be stored in the buffer 122 as well pending occurrence of the wait event (and/or corresponding release of the synchronization object 120). As described, buffering rendering instructions in this regard can reduce perceptible delay in displaying the corresponding rendered frames as images via display device 102 by releasing the rendering instructions so they are processed for generating the rendered frame for display via display device 102 closer to the frame refresh (e.g., closer to VSYNC).

In method 300, optionally at action 308, instructions for a CPU task can be stored in a buffer before release of the synchronization object. In an example, operating system 108, application 110, display driver 112, etc., e.g., in conjunction with processor 104 and/or memory 106, can store, in the buffer 122 or another buffer or portion of memory 106, the instructions for the CPU task before release of the synchronization object. For example, the CPU task may relate to one or more instructions to be performed by the processor 104 when the synchronization object is released. For example, the CPU task can correspond to, for example, a resampling of a position of a head-mounted VR device, based on which rendering instructions for the GPU can be generated. Thus, in one example, the instructions related to the CPU task may be stored in the buffer 122 alternatively to the rendering instructions, and the rendering instructions can be generated based on the CPU task following occurrence of the wait event.

In method 300, at action 310, the release of the synchronization object can be detected at a time associated with the wait event. In an example, operating system 108, application 110, display driver 112, etc., e.g., in conjunction with processor 104 and/or memory 106, can detect the release of the synchronization object 120 at the time associated with the wait event. For example, the synchronization object 120 can determine the wait event occurs based on determining that a time (e.g., a system time maintained by the processor 104) is at or substantially equal to the configured time for the wait event (e.g., the time offset from the timed event of the display device 102). In another example, the wait event can correspond to a detected change in a number maintained by the synchronization object 120. For example, the synchronization object 120 can be initialized with a current or next rendered frame number from the GPU 114. In this example, the number can be incremented when the wait event occurs, and incrementing of the number can be the detected wait event at action 310. In addition, for example, operating system 108, application 110, display driver 112, etc. may compare the number of the synchronization object 120 to an expected number to ensure the wait event applies to the expected rendered frame before sending the rendering instructions from the buffer 122.

In method 300, at action 312, the plurality of rendering instructions can be sent from the buffer to at least a portion of the GPU based on detecting the release of the synchronization object. In an example, operating system 108, application 110, display driver 112, etc., e.g., in conjunction with processor 104 and/or memory 106, can send, based on detecting the release of the synchronization object 120, the plurality of rendering instructions from the buffer 122 to at least a portion of the GPU 114. For example, operating system 108, application 110, display driver 112, etc., can release the plurality of rendering instructions to the GPU 114 based on receiving a callback related to the release of the synchronization object 120 based on occurrence of the wait event. In one example, in this regard, operating system 108, application 110, display driver 112, etc., may utilize an application programming interface (API) exposed by the GPU 114 to provide the plurality of rendering instructions to the GPU 114. As described, the GPU 114 can process the rendering instructions and accordingly generate a rendered frame and/or transmit corresponding signals to the display device 102 to display the rendered frame.

In an example, operating system 108, application 110, display driver 112, etc., can then create another synchronization object 120 based on the next timed event (e.g., a next instance of the timed event, such as the next frame refresh, or VSYNC). In another example, the action of actually creating the synchronization object 120 may be performed once for multiple timed event instances, which may be periodic event instances. In either case, after release of one synchronization object 120, a subsequent synchronization object 120, and/or a subsequent wait event, can be initialized, and rendering instructions can again be stored in buffer 122 for subsequently providing to the GPU 114 when the subsequent synchronization object releases the subsequent wait event.

In another example, where GPU 114 creates the synchronization object 220 (e.g., at action 304), GPU 114 can receive rendering instructions from the operating system 108, application 110, display driver 112, etc. at substantially any time (e.g., when ready), but can store the rendering instructions in buffer 222 while awaiting the wait event associated with the synchronization object 220. GPU 114 may continue to store and release other instructions from regular buffer 224 during this time so as to allow the other instructions to be processed though the rendering instructions from operating system 108, application 110, display driver 112, etc., may be held in buffer 222 and blocked from being processed until the wait event occurs. In one example, the regular buffer 224 may store other rendering instructions for other applications 110 and/or rendering instructions that may be determined not to be subject to possible re-projection. When the GPU 114 detects or otherwise receives an indication that the wait event has occurred and/or has released the synchronization object 220, GPU 114 may release the rendering instructions from the buffer 222 for processing by another portion of the GPU 114, such as a command processor, primitive processor, or other processor of the GPU 114 configured to generate the rendered frame and/or provide the signals to the display device 102 to cause display of the rendered frame.

In either case, sending the rendering instruction from the buffer 122, 222 can also include flushing the rendering instructions from the buffer 122, 222 to allow for storing additional subsequent rendering instructions.

In method 300, optionally at action 314, the instructions for the CPU task can be performed based on detecting release of the synchronization object. In an example, operating system 108, application 110, display driver 112, etc., e.g., in conjunction with processor 104 and/or memory 106, can perform, based on detecting release of the synchronization object, the instructions for the CPU task. As described, in an example, the CPU task may relate to resampling of a position of a head-mounted VR device, such that the position can be resampled by the CPU at a moment in time that is near to starting the rendering based on corresponding rendering instructions at the GPU 114. For example, this may cause the operating system 108 to buffer (e.g., in buffer 122, 222) or send rendering instructions of a re-projected scene to the GPU 114 based on the position of the head-mounted VR device.

In a specific example, the application 110 can include at least a portion of a compositor that schedules work to (e.g., sends rendering instructions to) the GPU 114 when the wait event occurs. For example, the compositor can aggregate data from various sources (e.g. other applications desiring to render graphics on the display device 102) and can compose the data on the display device 102. Because the compositor can be responsible for the "final scene" perceived by the user it can also be responsible for the last stage re-projection (e.g., the distortion of the final image to take into account head movement that occurred between the final scene was generated and the time it is being displayed by the display device 102). Moreover, for example, the compositor may have both a CPU part (the part that aggregates data from the sources and determines rendering instructions), such as processor 104, and a GPU part (that does the actual rendering), such as GPU 114.

In one example, the synchronization object 120, 220 can include a monitored fence object that allows a processor (e.g., CPU core, GPU engine, etc., which may be part of processor 104 or GPU 114) to signal or wait on a particular fence object, which can be the wait event described herein. The compositor can use the notification of the wait event to perform work close to presenting the image. For example, a VR device that employs the compositor executing via processor 104, employs the GPU 114, etc., may transform a last rendered image with new position and/or orientation data from the VR device before presenting the frame to reduce input latency, judder, etc. Accordingly, as described the wait event may occur at a fixed time offset before the VSYNC (e.g., time of VSYNC minus a time offset), which can allow the compositor to prepare the frame for the VSYNC with low latency before the VSYNC.

In this example, the compositor creates the synchronization object (e.g., as a periodic monitored fence that can wait on periodically occurring wait events, such as at the time offset from various VSYNCs). In an example, the periodic synchronization object may continue to signal wait events until the object is destroyed or cancelled by the operating system 108 (e.g., when it can no longer provide notification of the wait event). For example, the compositor (e.g., via operating system 108, application 110, display driver 112, etc.) can cancel the synchronization object 120, 220 when the display device 102 is powered off or otherwise loses connection with the computing device 100, when an operating mode or other parameters of the display device 102 are changed, etc. Accordingly, for example, the compositor can be aware of these limitations of the display device 102, and can accordingly handle. If the wait event or corresponding notification is cancelled, the compositor can destroy the synchronization object 120, 220. If the compositor is waiting on a wait event at this time, the wait can be aborted by the compositor, the synchronization object 120, 220 can become invalid, and/or the corresponding value (e.g., of the wait event) can be set to a maximum value, to 0, etc. Additionally, in an example, the synchronization object 120, 220 can apply to a specific frame (e.g., based on present rendering statistics), such that the compositor can wait for a specific frame's wait event before forwarding the rendering instructions for that frame.

In addition, though the wait event may be initialized at a specific time offset, it is possible that system events or interrupts (or deferred procedure calls (DPC), etc.) may delay the signals sent from the GPU 114 to the display device 102, and thus the rendered frame may not be sent to the display device 102 in time to be displayed at the frame refresh. Accordingly, the compositor can decide how much tolerance to account for in setting the time offset. As described, in an example, the compositor can set the time offset based on previous renderings by the GPU 114 and whether the renderings were performed in time for the desired frame refresh (e.g., set a larger time offset where a threshold number or percentage of previous renderings where not performed in time for the desired frame refresh).

Additionally, in an example, the display device 102 may have an adaptive synchronization technology where the display device 102 may wait to receive the signals from the GPU 114 for a blank period of time after a scan region before refreshing the display panel 132. The compositor may additionally consider the blank period in determining the time offset for the synchronization object (e.g., the compositor may set the time offset so presenting the rendered frame occurs in the blank period between scan regions of an adaptive synchronization display device 102. In an example, the display interface 116 may obtain such information regarding the display device 102, and the compositor can acquire the synchronization properties of the display device 102 via display driver 112 communicating with the display interface 116.

Figure 4:
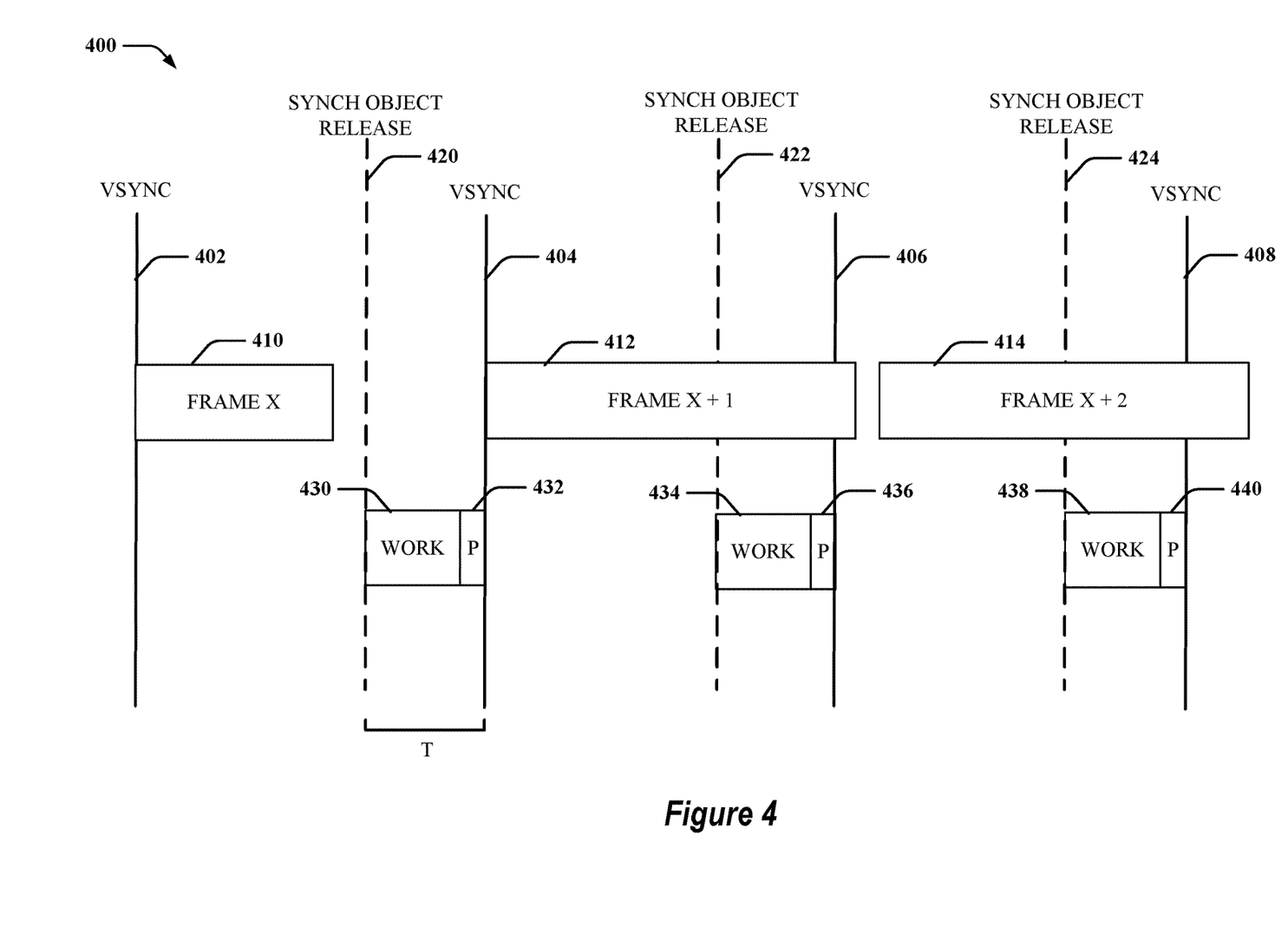
FIG. 4 is an example of a timeline for sending rendering instructions to a GPU, or a portion thereof, in accordance with examples described herein.

FIG. 4 illustrates an example of a timeline 400 showing a plurality of VSYNCs 402, 404, 406, 408 that can occur on a display interface 116 (e.g., based on determining corresponding frame refreshes of a display device 102). After VSYNC 402, frame X 410, which can be rendered by the GPU 114, is provided to the display device 102 for displaying via display panel 132, as described. Similarly, after VSYNC 404, frame X+1 412, which can be rendered by the GPU 114, is provided to the display device 102. This frame may take longer for display device 102 to draw, and VSYNC 406 may occur before drawing is completed, but in any case, frame X+2 414 can be provided to the display device 102 sometime after VSYNC 406.

As shown, for example, the synchronization object can be created to have a wait event 420 (synchronization object release) based on a time offset, T, from VSYNC 404. Additional wait events 422, 424 are provided to have a time offset from VSYNCs 406, 408, respectively. Based on the wait event 420 (e.g., release of the synchronization object), rendering instructions are sent from a buffer (e.g., buffer 122, 222) to the GPU 114 (or another portion of the GPU 114 where the GPU 114 initializes the synchronization object) to schedule work 430 at the GPU 114 to generate the rendered frame from the rendering instructions. The GPU 114 can then present 432 the rendered frame to the display device 102 before (or at) VSYNC 404, to allow the display device 102 enough time to receive the rendered frame before the frame refresh, and the display device 102 can display rendered frame X+1 412.

Figure 5:
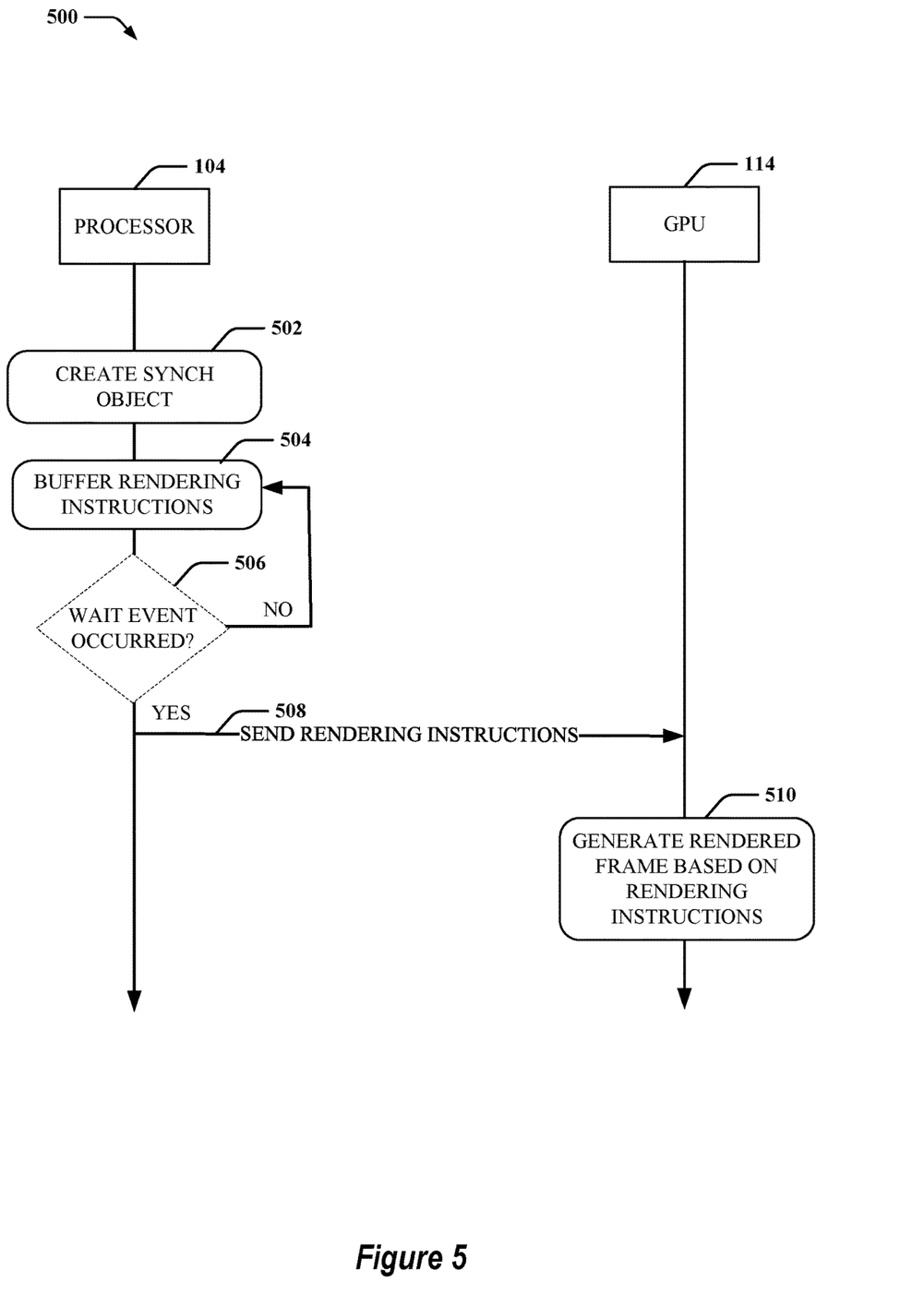
FIG. 5 is a flow diagram of an example of a system for sending rendering instructions to a GPU based on a synchronization object in accordance with examples described herein.

FIG. 5 illustrates an example of a system 500 and corresponding functionality that may be included in a computing device. System 500 includes a processor 104 and GPU 114. The processor 104 can create a synchronization object at 502. For example, the processor 104 may create the synchronization object based on a request from an application that provides images to the GPU 114 for rendering, based on a request from a display driver, etc. For example, processor 104 can create the synchronization object to include a handle, which may be associated with a callback function that can be called when a wait event associated with the synchronization object occurs. For example, processor 104 can create the synchronization object based on a wait event set to occur at a time offset from a timed event of a display device, as described (e.g., frame refresh, VSYNC, etc.). Based on creating the synchronization object, the processor 104 can begin buffering rendering instructions at 504. The processor 104 can buffer rendering instructions received from the application, display driver, etc. in a memory until the wait event occurs. Processor 104 can optionally determine whether the wait event has occurred at 506 and/or can wait for a callback when the wait event occurs. While the wait event has not occurred, the processor 104 can continue to buffer any rendering instructions received from the application, display device, etc. at 504. When the wait event occurs at 506, processor 104 can send the buffered rendering instructions from the buffer to the GPU 114 for processing at 508.

In one example, as described above, a task or instruction of CPU/processor 104 can be blocked by the wait event, and execution of the task or instructions (e.g., after the wait event) may result in generation of corresponding GPU rendering instructions (or not). For example, the instructions buffered at 504 may include instructions to determine a scene orientation related to an application (e.g., by a compositor), and/or instructions to determine a change in position of a head-mounted VR device. When the wait event occurs at 506, the instructions (e.g., buffered at 504) may be executed by the processor 104 to determine a new scene orientation (e.g., based on a determined change in position of the head-mounted VR device), which may cause generation of corresponding rendering instructions to render the new scene orientation. Thus, processor 104 can accordingly send the rendering instructions to GPU 114 at 508. In any case, GPU 114 can generate a rendered frame based on the rendering instructions at 510.

Figure 6:
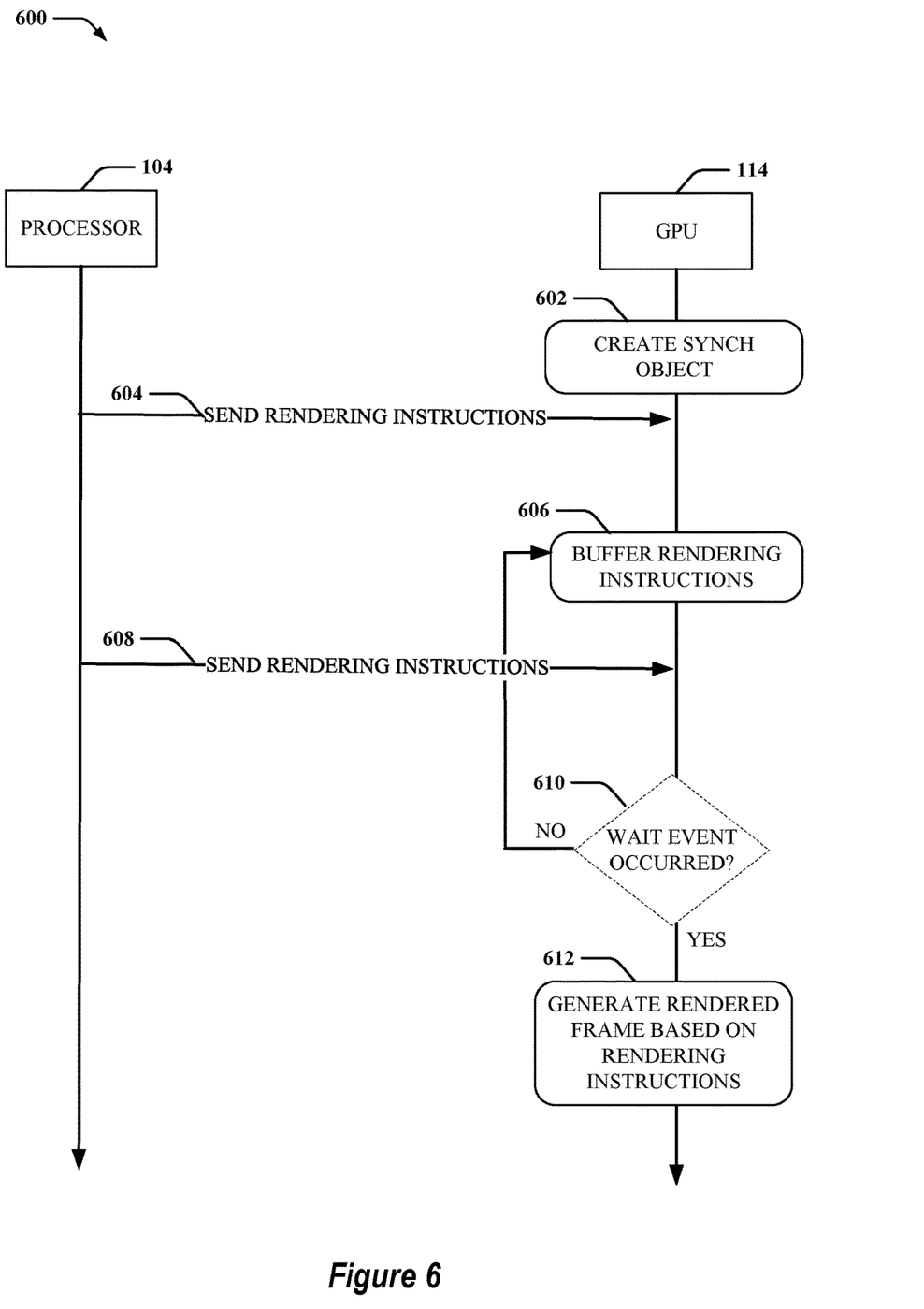
FIG. 6 is a flow diagram of an example of a system for sending rendering instructions to a GPU, where the GPU creates a synchronization object in accordance with examples described herein.

FIG. 6 illustrates an example of a system 600 and corresponding functionality that may be included in a computing device. System 600 includes a processor 104 and GPU 114. The GPU 114 can create a synchronization object at 602. For example, the GPU 114 may create the synchronization object based on a request from an application that provides images to the GPU 114 for rendering, based on a request from a display driver, etc. For example, GPU 114 can create the synchronization object to include a callback function that can be called when a wait event associated with the synchronization object occurs. For example, GPU 114 can create the synchronization object based on a wait event set to occur at a time offset from a timed event of a display device, as described (e.g., frame refresh, VSYNC, etc.). Processor 104 can send rendering instructions to the GPU 114 at 604, and based on creating the synchronization object, the GPU 114 can begin buffering rendering instructions at 606. The GPU 114 can continue to buffer rendering instructions received from the processor 104 until the wait event occurs. Thus, for example, processor 104 can send rendering instructions to the GPU 114 at 608 as well, and if the wait event has not occurred at 610, GPU 114 can buffer the rendering instructions at 606. GPU 114 can optionally determine whether the wait event has occurred at 610 and/or can wait for a callback when the wait event occurs. While the wait event has not occurred, the GPU 114 can continue to buffer any rendering instructions, as described. When the wait event occurs at 610, GPU 114 can generate the rendered frame based on the rendering instructions at 612, which may include providing the rendering instructions to another portion of the GPU (e.g., to one or more processors from a buffer of the GPU 114, as described).

Figure 7:
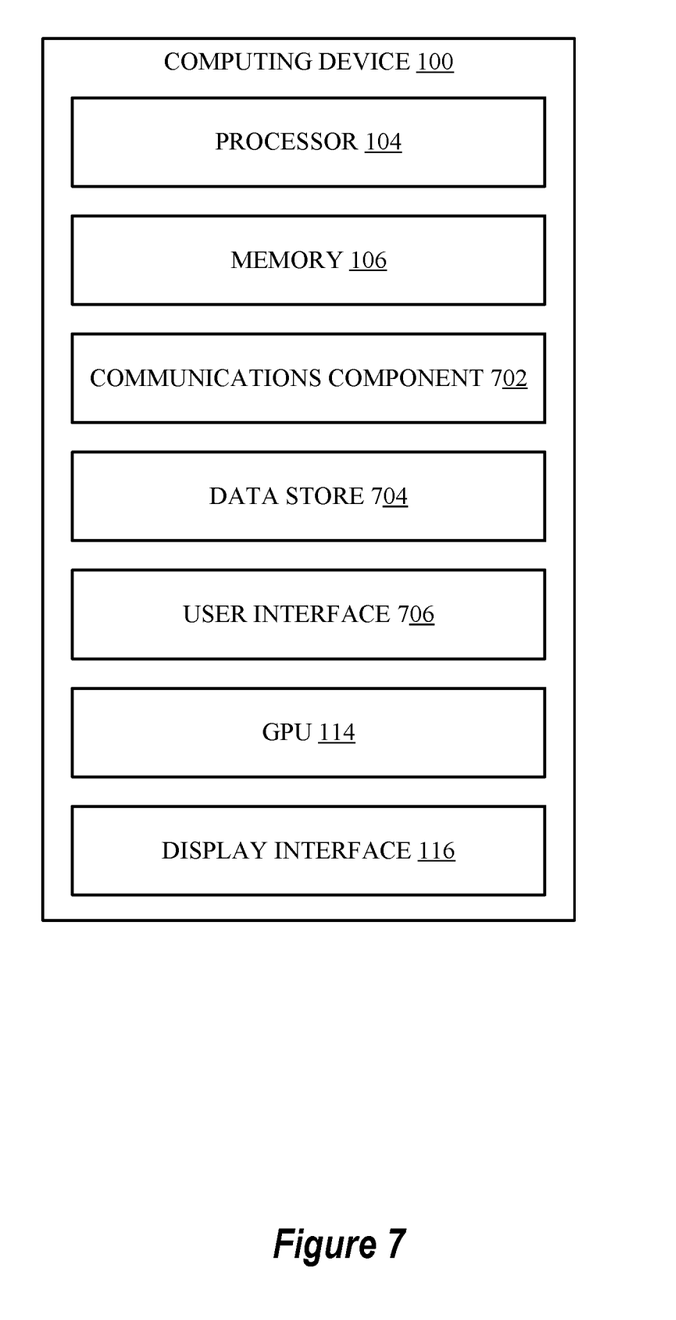
FIG. 7 is a schematic diagram of an example of a computing device for performing functions described herein.

FIG. 7 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, display drivers, etc., as described herein, and/or other components of the computing device 100.

Further, computing device 100 may include a communications component 702 that provides for establishing and maintaining communications with one or more other devices, parties, entities, etc. utilizing hardware, software, and services as described herein. Communications component 702 may carry communications between components on computing device 100, as well as between computing device 100 and external devices, such as devices located across a communications network and/or devices serially or locally connected to computing device 100. For example, communications component 702 may include one or more buses, and may further include transmit chain components and receive chain components associated with a wireless or wired transmitter and receiver, respectively, operable for interfacing with external devices.

Additionally, computing device 100 may include a data store 704, which can be any suitable combination of hardware and/or software, that provides for mass storage of information, databases, and programs employed in connection with examples described herein. For example, data store 704 may be or may include a data repository for applications and/or related parameters not currently being executed by processor 104. In addition, data store 704 may be a data repository for an operating system, application, display driver, etc. executing on the processor 104, and/or one or more other components of the computing device 100.

Computing device 100 may also include a user interface component 706 operable to receive inputs from a user of computing device 100 and further operable to generate outputs for presentation to the user (e.g., via display interface 116 to a display device). User interface component 706 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 706 may include one or more output devices, including but not limited to a display interface 116, a speaker, a haptic feedback mechanism, a printer, any other mechanism capable of presenting an output to a user, or any combination thereof.

Computing device 100 can also include a GPU 114, as described herein, for rendering frames based on rendering instruction received from processor 104. GPU 114 can additional send signals via a display interface 116 to cause display of the rendered frames on a display device.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for rendering graphics using a graphics processing unit (GPU) in a computing device, comprising:
creating, by a central processing unit (CPU), a synchronization object to release at a timed event configured to occur at a time offset before a vertical synchronization (VSYNC) event that is synchronized with a vertical blanking interval of a display device;

storing, by the CPU and in a buffer and before release of the synchronization object, a plurality of rendering instructions for the GPU, wherein the plurality of rendering instructions are received from an application before a release of the synchronization object, and wherein the plurality of rendering instructions include instructions for rendering an image frame and instructions for reprojecting the image frame;

detecting, by the CPU, the release of the synchronization object, wherein the release of the synchronization object is based on occurrence of the timed event; and sending, by the CPU and based on detecting the release of the synchronization object, the plurality of rendering instructions from the buffer to at least a portion of the GPU to facilitate the GPU rendering the image frame and/or reprojecting the image frame, after release of the synchronization object, based on the plurality of rendering instructions.

2. The method of claim 1, wherein creating the synchronization object further comprises:

receiving, from the display interface, an indication of a timing associated with the vertical synchronization event; and setting the timed event to occur at a time value computed based at least in part on applying the time offset to the timing of the vertical synchronization event.

3. The method of claim 1, further comprising setting the time offset based at least in part on one or more parameter values configured for the display interface of the computing device that is coupled to the display device.

4. The method of claim 1, further comprising adjusting the time offset based at least in part on a result of one or more previous renderings of previous rendering instructions sent to the GPU based on a previous synchronization object.

5. The method of claim 1, wherein creating the synchronization object comprises creating the synchronization object in the GPU, wherein the buffer is in the GPU, and further comprising storing other instructions in a different buffer of the GPU for providing to at least another portion of the GPU without waiting for the release of the synchronization object.

6. The method of claim 1, further comprising:

storing, by the CPU and in the buffer or another buffer, instructions for performing a CPU task before release of the synchronization object; and performing, by the CPU and based on detecting the release of the synchronization object, the CPU task.

7. The method of claim 1, further comprising determining the updated position or orientation based on resampling a position of a head-mounted device.

8. A computing device for rendering graphics, comprising:

a memory storing one or more parameters or instructions for executing an operating system and one or more applications;

a graphics processing unit (GPU) for rendering frames of the one or more applications for display on a display device coupled to the computing device;

a display interface coupled with the display device for communicating signals to display rendered frames on the display device; and at least one processor coupled to the memory, the GPU, and the display interface, wherein the at least one processor is configured to:

create a synchronization object to release at a timed event configured to occur at a time offset before a vertical synchronization event of the display interface, wherein the vertical synchronization (VSYNC) event that is synchronized with a vertical blanking interval of a display device;

store, in a buffer in the memory and before release of the synchronization object, a plurality of rendering instructions for the GPU, wherein the plurality of rendering instructions are received from at least one of the one or more applications before a release of the synchronization object, and wherein the plurality of rendering instructions include instructions for rendering an image frame and instructions for reprojecting the image frame;

detect the release of the synchronization object, wherein the release of the synchronization object is based on occurrence of the timed event; and send, based on detecting the release of the synchronization object, the plurality of rendering instructions from the buffer to at least a portion of the GPU to facilitate the GPU rendering the image frame and/or reprojecting the image frame, after release of the synchronization object, based on the plurality of rendering instructions.

9. The computing device of claim 8, wherein the at least one processor is further configured to:

receive, from the display interface, an indication of a timing associated with the vertical synchronization event; and set the timed event to occur at a time value computed based at least in part on applying the time offset to the timing of the vertical synchronization event.

10. The computing device of claim 8, wherein the at least one processor is further configured to set the time offset based at least in part on one or more parameter values configured for the display interface of the computing device that is coupled to the display device.

11. The computing device of claim 8, wherein the at least one processor is further configured to adjust the time offset based at least in part on a result of one or more previous renderings of previous rendering instructions sent to the GPU based on a previous synchronization object.

12. The computing device of claim 8, wherein the at least one processor is configured to create the synchronization object in the GPU, wherein the buffer is in the GPU, and wherein the GPU is configured to receive the plurality of rendering instructions from a display driver.

13. The computing device of claim 12, wherein the GPU is configured to store other instructions in a different buffer of the GPU for providing to at least another portion of the GPU without waiting for the release of the synchronization object.

14. The computing device of claim 8, wherein the at least one processor is further configured to:

store, in the buffer or another buffer, instructions for performing a central processing unit (CPU) task before release of the synchronization object; and perform, based on detecting the release of the synchronization object, the CPU task.

15. A non-transitory computer-readable medium, comprising code executable by one or more processors for rendering graphics using a graphics processing unit (GPU) in a computing device, the code comprising code for:

creating, by a central processing unit (CPU), a synchronization object to release at a timed event configured to occur at a time offset before a vertical synchronization (VSYNC) event that is synchronized with a vertical blanking interval of a display device;

storing, by the CPU and in a buffer and before release of the synchronization object, a plurality of rendering instructions for the GPU, wherein the plurality of rendering instructions are received from an application before a release of the synchronization object, and wherein the plurality of rendering instructions include instructions for rendering an image frame and instructions for reprojecting the image frame;

detecting, by the CPU, the release of the synchronization object, wherein the release of the synchronization object is based on occurrence of the timed event; and sending, by the CPU and based on detecting the release of the synchronization object, the plurality of rendering instructions from the buffer to at least a portion of the GPU to facilitate the GPU rendering the image frame and/or reprojecting the image frame, after release of the synchronization object, based on the plurality of rendering instructions.

16. The non-transitory computer-readable medium of claim 15, the code for creating the synchronization object further comprising code for:

receiving, from the display interface, an indication of a timing associated with the vertical synchronization event; and setting the timed event to occur at a time value computed based at least in part on applying the time offset to the timing of the vertical synchronization event.

17. The non-transitory computer-readable medium of claim 15, the code further comprising code for setting the time offset based at least in part on one or more parameter values configured for the display interface of the computing device that is coupled to the display device.

18. The non-transitory computer-readable medium of claim 15, the code further comprising code for adjusting the time offset based at least in part on a result of one or more previous renderings of previous rendering instructions sent to the GPU based on a previous synchronization object.

19. The non-transitory computer-readable medium of claim 15, wherein the code causes the GPU to create the synchronization object, wherein the buffer is in the GPU, and further comprising code for storing other instructions in a different buffer of the GPU for providing to at least another portion of the GPU without waiting for the release of the synchronization object.

* * * * *